US009384201B2

(12) United States Patent
Hwang et al.

(10) Patent No.: US 9,384,201 B2
(45) Date of Patent: Jul. 5, 2016

(54) METHOD OF MANAGING DATA OF FILE SYSTEM USING DATABASE MANAGEMENT SYSTEM

(71) Applicant: SAMSUNG ELECTRONICS CO., LTD., Suwon-si, Gyeonggi-do (KR)

(72) Inventors: Joo-young Hwang, Suwon-si (KR); Min-sung Jang, Seoul (KR); Jae-kyoung Bae, Hwaseong-si (KR); Ha-young Kim, Suwon-si (KR); Alexander Kirnasov, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 244 days.

(21) Appl. No.: 13/904,493

(22) Filed: May 29, 2013

(65) Prior Publication Data

US 2013/0262535 A1    Oct. 3, 2013

Related U.S. Application Data

(63) Continuation of application No. 11/717,061, filed on Mar. 13, 2007, now abandoned.

(60) Provisional application No. 60/784,481, filed on Mar. 22, 2006.

(30) Foreign Application Priority Data

Jun. 13, 2006  (KR) .......................... 10-2006-0053116

(51) Int. Cl.
*G06F 17/30* (2006.01)

(52) U.S. Cl.
CPC ...... *G06F 17/30091* (2013.01); *G06F 17/3012* (2013.01); *G06F 17/30138* (2013.01); *G06F 17/30227* (2013.01)

(58) Field of Classification Search
CPC .......... G06F 17/30091; G06F 17/3012; G06F 17/30139; G06F 17/30227
See application file for complete search history.

(56) References Cited

U.S. PATENT DOCUMENTS 6,922,708 B1    7/2005    Sedlar
7,418,435 B1    8/2008    Sedlar
(Continued)

FOREIGN PATENT DOCUMENTS

CN    1517906 A       8/2004
JP    2002-023960 A   1/2002
(Continued)

OTHER PUBLICATIONS

Kashyap, A., "File system extensibility and reliability using an in-Kernal database", M.SC. Thesis, Stony Brook University, (Online) Dec. 2004, pp. 1-27, Stony Brook, NY US.
(Continued)

*Primary Examiner* — Tarek Chbouki
(74) *Attorney, Agent, or Firm* — Sughrue Mion, PLLC (57) ABSTRACT

A method of managing data of a file system using a database management system is provided. According to the method, the metadata of the file system is managed using a database management system (DBMS), but writing data to or reading data from a disk is directly performed by the file system according to the method directly performed not through other file systems or DBMSs. In this way, stable transactions are guaranteed for a user, and the user can design a disk allocation algorithm optimized with respect to a multimedia environment.

9 Claims, 7 Drawing Sheets

(56) References Cited

U.S. PATENT DOCUMENTS

| | | |
|---|---|---|
| 7,467,163 B1 | 12/2008 | Dodds et al. |
| 7,539,706 B1 | 5/2009 | Campbell |
| 7,580,950 B2 | 8/2009 | Kavuri et al. |
| 2002/0065792 A1 | 5/2002 | Bonner et al. |
| 2002/0174189 A1* | 11/2002 | Peng ................ H04L 29/06 709/217 |
| 2003/0056082 A1 | 3/2003 | Maxfield |
| 2004/0111250 A1 | 6/2004 | Hensley |
| 2005/0114291 A1 | 5/2005 | Becker-Szendy et al. |
| 2005/0182911 A1 | 8/2005 | Kaiser |
| 2005/0193132 A1 | 9/2005 | O'Brien et al. |
| 2006/0053475 A1 | 3/2006 | Bezilla et al. |
| 2006/0053476 A1 | 3/2006 | Bezilla et al. |
| 2007/0022148 A1* | 1/2007 | Akers et al. ................ 707/205 |
| 2007/0073840 A1 | 3/2007 | O'Brien et al. |
| 2007/0168640 A1 | 7/2007 | Hrle et al. |
| 2007/0198591 A1 | 8/2007 | Teng et al. |
| 2008/0040406 A1 | 2/2008 | Maxfield |
| 2008/0162485 A1 | 7/2008 | Long et al. |
| 2008/0229047 A1 | 9/2008 | Shmueli et al. |
| 2008/0263089 A1 | 10/2008 | Cousins |

FOREIGN PATENT DOCUMENTS

| | | |
|---|---|---|
| JP | 2005-326992 A | 11/2005 |
| KR | 10-2003-0071245 A | 10/2004 |
| KR | 10-2004-0108818 A | 12/2004 |
| KR | 10-2005-0010973 A | 1/2005 |
| KR | 10-2006-0048655 A | 5/2006 |

OTHER PUBLICATIONS

Murphy, N. et al., "The design and implementation of the database file system", Internet Article, (Online), Jan. 11, 2002, pp. 1-12, Harvard University, Cambridge, MA US.

Choudhary, A. et al., "Data management for large-scale scientific computations in high performance distributed systems", The Eight International Symposium on High Performance Distributed Computing, Aug. 3, 1999-Aug. 6, 1999, pp. 263-272, Redondo Beach, CA, US.

* cited by examiner

| DB | unit | key | data | structure | secondary index |
|---|---|---|---|---|---|
| super | partition | partition number | superblock data | RECNO | – |
| dir | partition | parent INO/file name | INO | B-tree | INO(B tree) |
| inode | partition | INO | inode data | RECNO | – |
| free space | partition | PBN | length | B-tree | length(B tree) |
| extents | file | file offset | PBN/length | B-tree | – |

INO : inode number
RECNO : record number
PBN : physical block number

METHOD OF MANAGING DATA OF FILE SYSTEM USING DATABASE MANAGEMENT SYSTEM

CROSS-REFERENCE TO RELATED PATENT APPLICATIONS

This application is a continuation application of U.S. application Ser. No. 11/717,061 filed Mar. 13, 2007, which claims priority from Korean Patent Application No. 10-2006-0053116 filed on Jun. 13, 2006, in the Korean Intellectual Property Office and the benefit of U.S. Provisional Application No. 60/784,481 filed on Mar. 22, 2006, in the United States Patent and Trademark Office, the disclosures of which are incorporated herein by reference in their entireties.

BACKGROUND OF THE INVENTION

1. Field of the Invention

The present invention relates to a file system, and more particularly, to a method of managing data of a file system using a database management system.

2. Description of the Related Art

Unlike in the past, the recent development of multimedia technologies has enabled many consumer electronics products, such as personal video recorders, camcorders, and mobile phones, to be offered with embedded hard disks, and thus research projects on a technology for efficiently managing data using disks are being actively carried out.

In a file system determining a variety of policies related to input and output of data to and from a disk, consistency is a very important issue. Consistency of a file system can be divided into consistency of metadata and consistency of data. The metadata of a file system includes information about an inode, a directory, a free space of a disk, and a free inode. If operations related to these metadata items are performed as a transaction, the consistency of the metadata can be maintained.

Likewise, the consistency of data can be maintained through a data transaction, and if a data transaction for updating part of a file is aborted in the middle of the update operation, the data transaction is completed or discarded as if the transaction had never been performed to begin with.

Meanwhile, a database management system (DBMS) reliably stores data by using a fast and effective data structure and guarantees transactions. In the past, there have been attempts to secure consistency of a file system by applying this DBMS solution to an operating system (OS).

Figure 1:
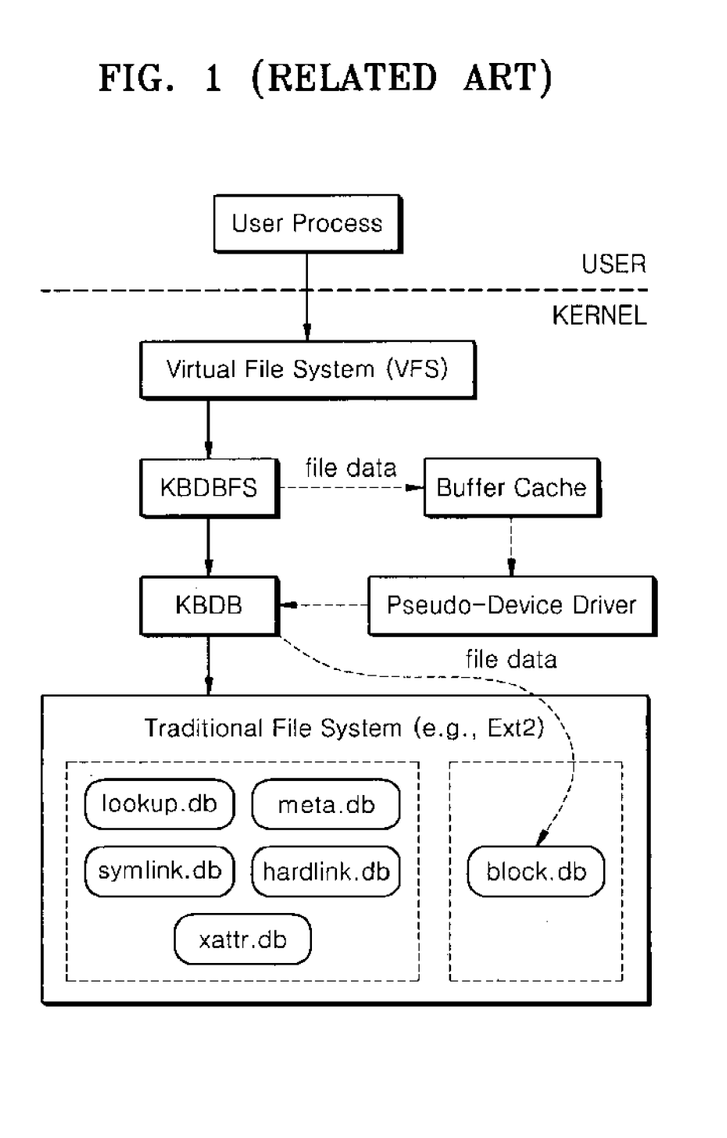
FIG. 1 is a block diagram illustrating a structure of a related art file system for managing metadata using a database.

FIG. 1 is a block diagram illustrating a structure of a related art file system employing a database.

In the file system illustrated in FIG. 1, the metadata and file data of a file system are managed by using a kernel Berkeley database (KBDB), and the database is stored in a traditional file system (e.g., Ext2). In this structure, all operations of the file system are performed through a DBMS.

For example, when a predetermined file is read, the DBMS is accessed, and file data stored in block.db is copied into a buffer cache, and when data is written in a file, data stored in the buffer cache is stored in a record corresponding to the data in block.db. Operations other than file input and/or output operations are also performed by using the DBMS, and thus the consistency of the file system can be guaranteed.

However, due to its dependency on the traditional file system (Ext2) storing the databases, this KBDB file system (KBDBFS) cannot be optimized with respect to a variety of environments. That is, the DBMS (KBDB) provides only transactional operations, and the size of a file system, disk allocation, and the like are determined by a file system storing databases. For example, when data is stored on a disk in this file system, the file system (KBDBFS) inputs data into the DBMS (KBDB) and the DBMS (KBDB) stores the data on the disk by using the traditional file system Ext2 and thus the file system (KBDBFS) cannot participate in the layout of the actual disk. Accordingly, according to this file system, even though an algorithm optimized for an environment is designed, it is impossible to apply the optimized algorithm to the allocation of blocks on a disk. Also, in a multimedia environment where the file size is generally large, the size of a log generated by the DBMS increases and thus the performance of the file system is deteriorated.

SUMMARY OF THE INVENTION

The present invention provides a method by which metadata of a file system is managed using a database management system (DBMS) while file data is directly input to or output from a disk without involvement of the DBMS.

According to an aspect of the present invention, there is provided a method of managing data in a file system including: searching for a free disk space by using a predetermined database management system (DBMS) managing metadata of the file system, when a data write request is received from an application; writing the data in the free disk space without involvement of the DBMS, by referring to the search result; and updating a part of the metadata changing with the data being written, by using the DBMS.

All operations from the searching operation to the updating operation may be managed by the DBMS as one transaction.

The file system may operate at a user level.

A disk on which the data is stored may be different from a disk on which the metadata is stored.

The updating of the part of the metadata may include requesting the DBMS to update at least one of a database table containing information about a free space, a database table containing information about a non-free space, and a database table containing information about an inode.

According to another aspect of the present invention, there is provided a computer readable recording medium storing a computer program for performing the methods.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 2:
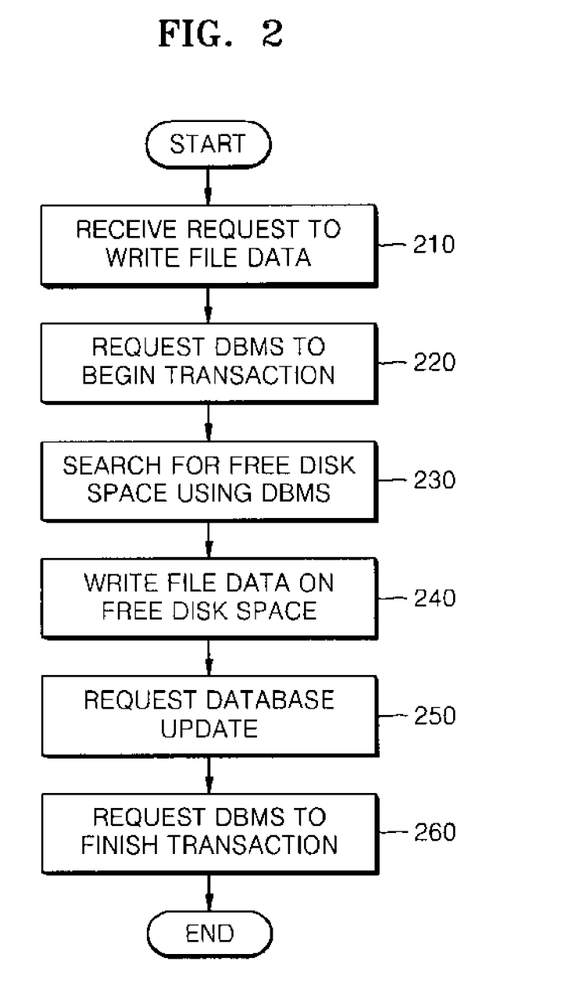
FIG. 2 is a flowchart illustrating a process of storing data on a disk in a file system according to an exemplary embodiment of the present invention.

FIG. 2 is a flowchart illustrating a process of storing data on a disk in a file system according to an exemplary embodiment of the present invention.

In operation 210, a file system according to the current embodiment receives a request to write file data on a disk from a user application. For this, the file system should provide an application layer with an application programming interface (API) at a user level corresponding to a system call.

In operation 220, the file system requests a database management system (DBMS) for managing metadata to begin transactions. Accordingly, operations that are to be performed in relation to the metadata after operation 220 are regarded as one transaction and protected.

In operation 230, free disk space is searched for in order to write the file data requested by the application. At this time, the free disk space is searched for referring to a database table including information about the free disk space. Details of a database schema for managing the DBMS will be explained later with reference to FIG. 3.

In operation 240, the file data is written in the free disk space. Depending on the situation, many free blocks may be found in operation 230. A disk allocation algorithm defined by the user may be used to determine in which block among the free blocks the requested file data is to be stored. This is because, in the file system according to the current embodiment, metadata is managed by a traditional file system, such as ext2, or DBMS but writing file data to or reading file data from a disk is performed directly by the file system and not through the DBMS or other file systems (raw I/O). In other words, the file system of an exemplary embodiment of the present invention does not participate in disk layout in relation to the metadata, since the metadata of the file system is processed through the API provided by the DBMS. However, in relation to the file data, the file system according to an exemplary embodiment of the present invention directly controls the disk layout and thus a disk allocation algorithm optimized with respect to a multimedia environment can be used. Also, since the DBMS neither manages file data nor generates a log on the file data, even though the size of the file increases, degradation of the performance of the file system does not occur.

In operation 250, the DBMS is requested to update metadata that should be changed as the file data is written on the disk. For example, database tables related to information about an inode, and free disk spaces and non-free disk spaces, may be updated.

In operation 260, the DBMS is requested to terminate the transaction. Accordingly, since the DBMS regards the operations 230 through 250 as one transaction, the metadata consistency of the file system is secured. For example, if, in operation 250, a database table including information about a non-free space is updated and then a power supply is cut off due to power failure before a database table including information about a free space is updated, the DBMS treats the updating of the database table including information about the non-free space as though no updating has occurred, and thus does not apply related data to the metadata.

Also, operation 250 is performed only when operation 240 is finished. That is, operation 250 is performed only after writing of the file data is finished. Accordingly, operation 240 is performed between operations 220 and 260, and thus the consistency of data can be secured. However, in order to improve the performance of the file system, operation 250 may be performed irrespective of whether or not operation 240 is finished.

Meanwhile, in order to improve the performance of the file system, a disk storing metadata may be disposed separately from a disk storing file data.

Figure 3:
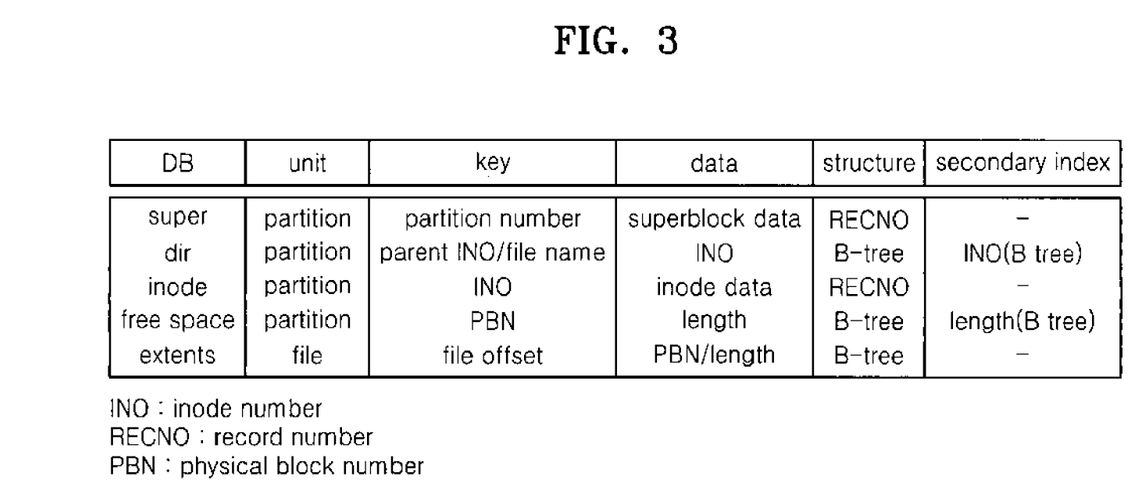
FIG. 3 illustrates a schema of a database storing metadata of a file system according to an exemplary embodiment of the present invention.

FIG. 3 illustrates a schema of databases storing metadata of a file system according to an exemplary embodiment of the present invention.

A super block database (super.db) stores information about the status of the file system and an inode bitmap. Information about the entire file system may be stored as one record. The inode bitmap also requires only a small number of records and thus this database has a record-number (RECNO)-based data structure and does not require a 2-dimensional index.

A directory database (directory.db) maps directory and file names and inode numbers.

An inode database (inode.db) maps an inode number and file information of a corresponding file, such as the size of the file and a last modified time. If a new file is created, a new inode record is added to this database and if a file is deleted, the record related to the file is deleted from this database.

A free space database (freespace.db) manages free spaces of a partition. At this time, information about free spaces in the database table may be expressed in the form of an extent, which is a continuous area of storage in a file system. The reason for expressing it in the form of an extent is that it can reduce the size of information more than when expressing it in the form of a bitmap. The extent format may be expressed with a block number specifying the start position of a free space and the number of blocks corresponding to the size of the free space, or may be expressed with a byte offset specifying the start position of the free space and a byte unit indicating the size of the free space. In the file system according to the current embodiment, in order to write data to a file, a free disk space is searched for by referring to the free space database.

An extent database (extents.db) maps an offset of a file and a block address of an extent including the file data.

Figure 4:
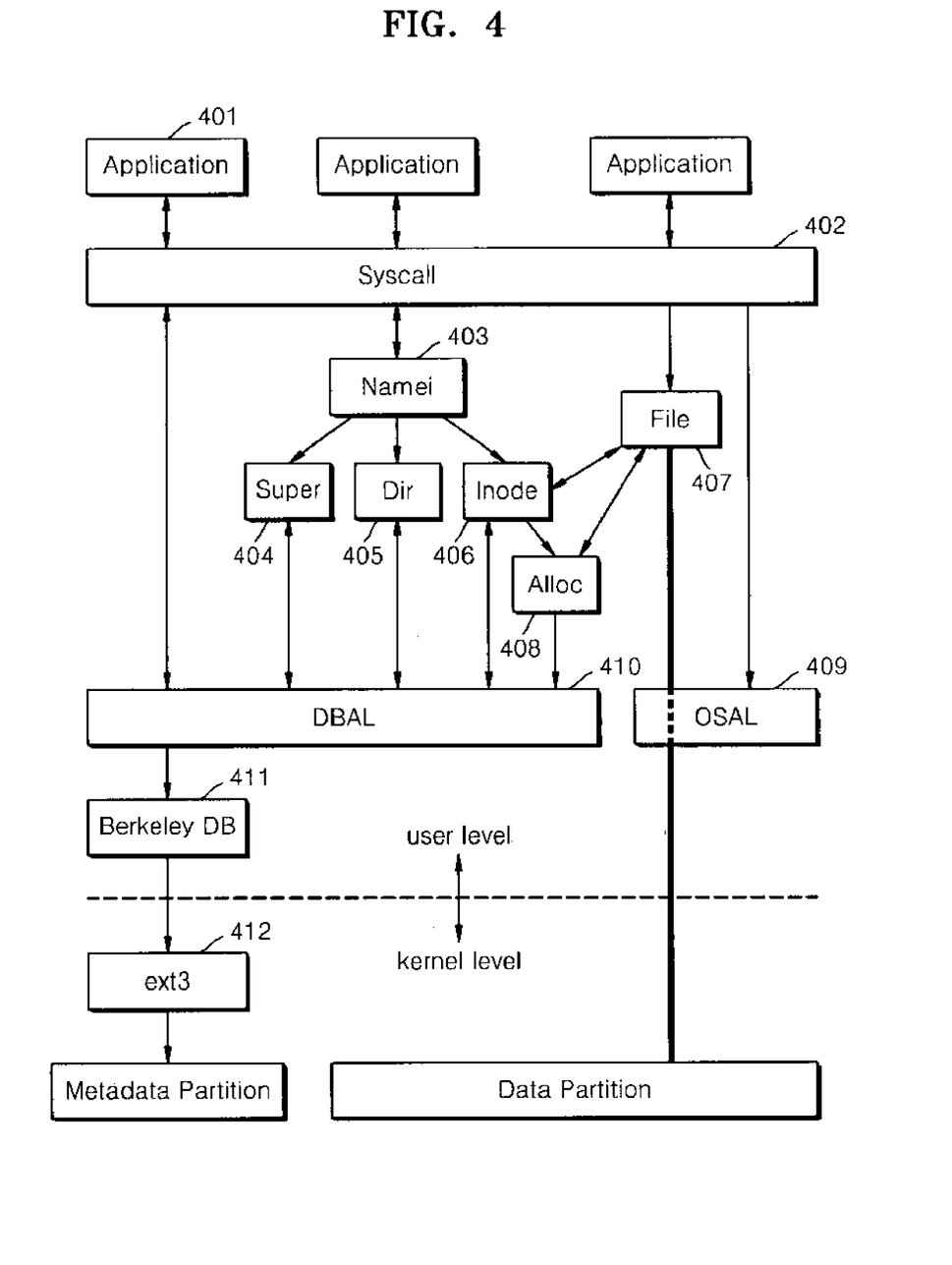
FIG. 4 is a block diagram illustrating a file system according to an exemplary embodiment of the present invention.

FIG. 4 is a block diagram illustrating a file system according to an exemplary embodiment of the present invention.

As illustrated in FIG. 4, the file system according to the current embodiment is composed of a Syscall module 402, a Namei module 403, a Super module 404, a Dir module 405, an Inode module 406, a File module 407, an Alloc module 408, a DB abstract layer (DBAL) module 410 and an OS abstract layer (OSAL) module 409. Also, in the current embodiment, a Berkeley DB 411 is used as a DBMS, and it is assumed that metadata of the file system is input to and/or output from a disk by ext3 412.

The Syscall module 402 provides an API in order to allow an application 401 to use a system call and requests the DBMS 411 to start and stop a transaction.

The Namei module 403 analyzes an API function called by the application 401 and determines a database that is to be updated. The Super module 404 requests the DBMS 411 to search and update super.db. The Dir module 405 requests the DBMS 411 to search and update dir.db. The Inode module 406 manages free inodes by using inode.db.

The Alloc module 408 obtains information about a free disk space, and determines blocks in which file data is to be written, by using a disk allocation algorithm optimized with respect to a multimedia environment or other environments.

The File module 407 inputs file data to or outputs file data from a disk through an OS module (not shown) operating at a kernel level. For example, the file data input and output can be performed in such a manner that data is written to a block device file or data is read from a block device file.

The DBAL module 410 is an interface to ensure compatibility with the Syscall module 402 and the DBMS 411. The OSAL module 409 is an interface enabling processing of a block device that may vary with respect to an OS.

Meanwhile, the file system according to the current embodiment as illustrated in FIG. 4 operates at a user level, and thus the source code of the file system does not rely on an OS. Accordingly, compared to a file system operating at a kernel level, the file system according to the current embodiment can be easily ported to other OSs, and also maintenance of the file system is easier.

Figure 5:
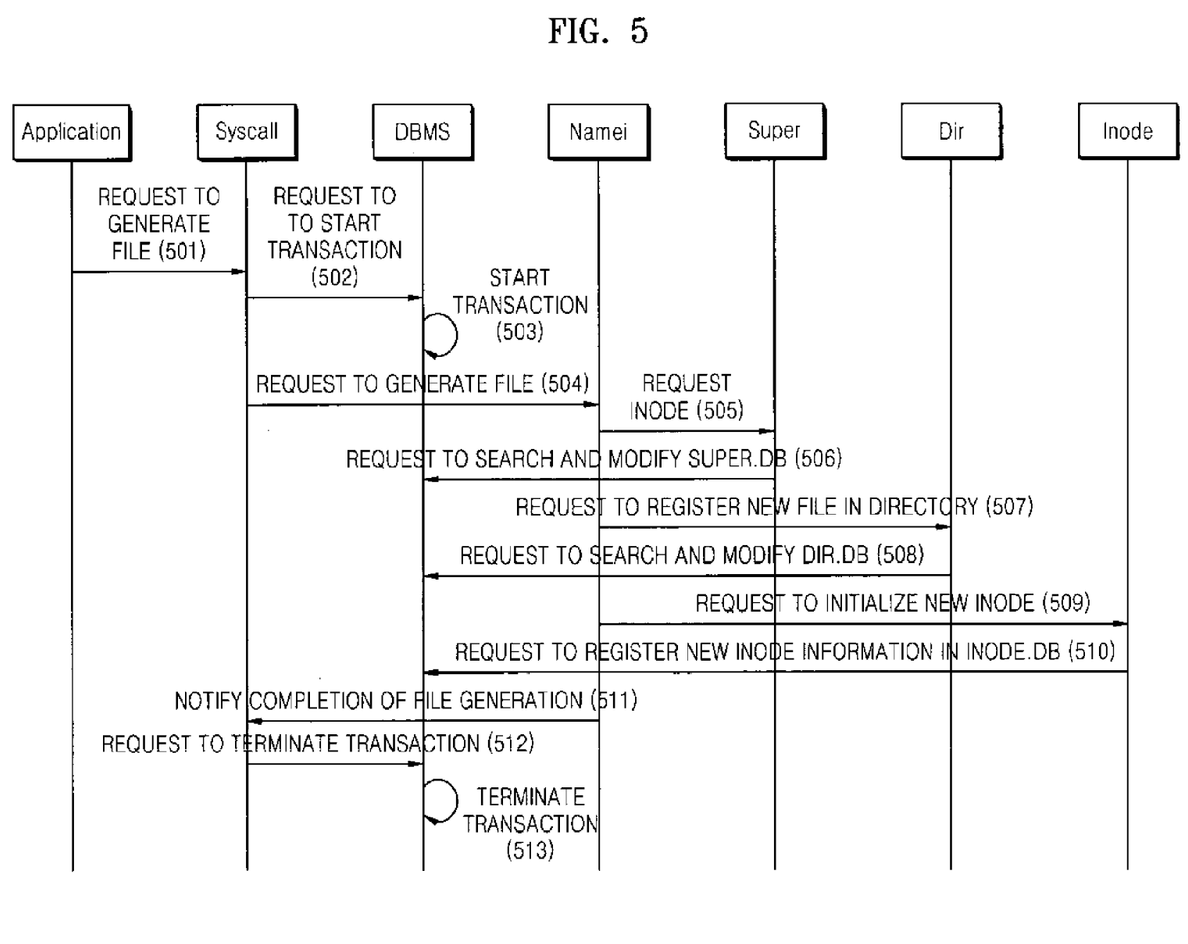
FIG. 5 is a diagram illustrating a process of creating a file in a file system according to an exemplary embodiment of the present invention.

FIG. 5 is a diagram illustrating a process of creating a file in the file system illustrated in FIG. 4 according to an exemplary embodiment of the present invention. In the current embodiment, it is assumed that the DBAL module 410 and the OSAL module 409 are not used.

In operation 501, the application 401 provides a file name to the Syscall module 402 and requests the Syscall module 402 to create a file. In operation 502, the Syscall module 402 requests the DBMS 411 to begin a transaction. In operation 503, the DBMS 411 begins the transaction.

In operation 504, the Syscall module 402 requests the Namei module 403 to create a file. In operation 505, the Namei module 403 requests the Super module 404 to provide an inode to be allocated to a new file. In operation 506, the Super module 404 that was requested to provide an inode from the Namei module 403 requests the DBMS 411 to search and modify super.db. After receiving the request, the DBMS 411 allocates a free inode to the new file by referring to the inode bitmap and updates super.db (not shown).

In operation 507, the Namei module 403 requests the Dir module 405 to register the new file in a directory. Accordingly, in operation 508, the Dir module 405 requests the DBMS 411 to search and modify dir.db. After receiving this request, the DBMS 411 maps the name of the new file and an inode corresponding to the file, and stores it in dir.db (not shown).

In operation 509, the Namei module 403 requests the Inode module 406 to perform initialization of the new inode. In operation 510, the Inode module 406 requests the DBMS 411 to register information about the new inode in inode.db. After receiving this request, the DBMS 411 stores information related to the new file in an inode corresponding to the new file (not shown).

If operation 510 is completed, the Namei module 403 informs the Syscall module 402, in operation 511, that the file generation is completed. In operation 512, the Syscall module 402 requests the DBMS 411 to finish the transaction. In operation 513, the DBMS 411 finishes the transaction which started in operation 503.

Figure 6:
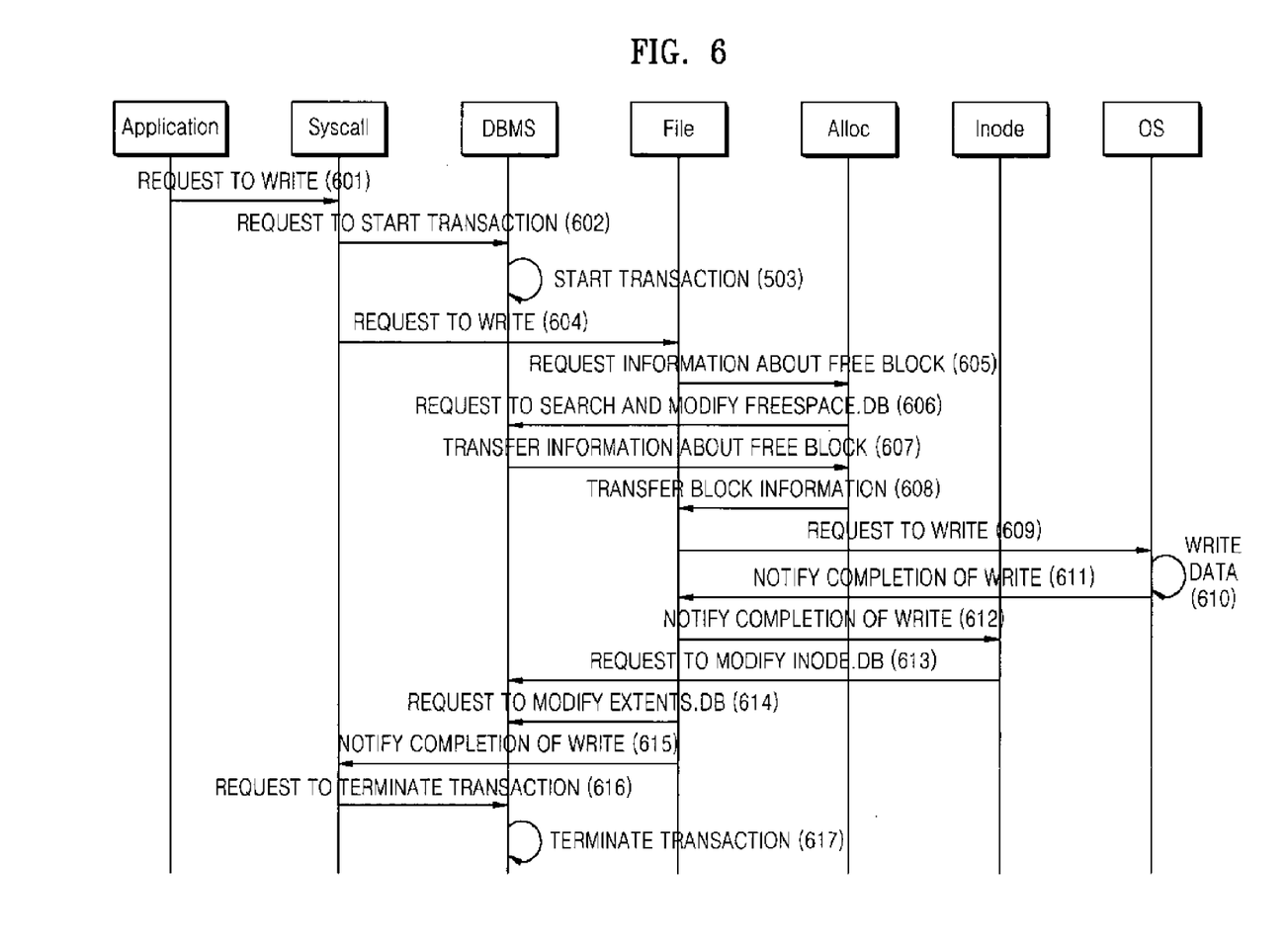
FIG. 6 is a diagram illustrating a process of writing a file in a file system according to an exemplary embodiment of the present invention.

FIG. 6 is a diagram illustrating a process of writing a file in the file system illustrated in FIG. 4 according to an exemplary embodiment of the present invention. In the current embodiment, it is assumed that the DBAL module 410 and the OSAL module 409 are not used.

In operation 601, the application 401 requests the Syscall module 402 to write data to a file. At this time, the name of the file, the data, the size of the data, and offset information in the file are transferred to the Syscall module 402. In operation 602, the Syscall module 402 requests the DBMS 411 to begin a transaction. In operation 603, the DBMS 411 begins the transaction.

In operation 604, the Syscall module 402 requests the File module 407 to perform a write operation. In operation 605, the File module 407 requests the Alloc module 408 to provide information about a free block of a partition. After receiving this request, the Alloc module 408 requests the DBMS 411 to search and modify freespace.db in operation 606. After receiving this request, the DBMS 411 finds free spaces by searching freespace.db and transfers information about free spaces to the Alloc module 408 in operation 607.

In operation 608, the Alloc module 408 transfers information about blocks in which data is to be written among free spaces of the partition, to the File module 407. At this time, the transferred information about the blocks may be different from the information about the free spaces transferred by the DBMS 411 in operation 607. That is, while, in operation 607, the DBMS 411 transfers information about all free blocks of the partition, the Alloc module 408 determines blocks in which data is to be written, by using a predetermined disk allocation algorithm, and then transfers the information about the determined blocks. Accordingly, the user can freely design a disk allocation algorithm in the Alloc module 408 and can thus establish a file system optimized with respect to a multimedia environment, without using the fixed disk allocation method according to traditional file systems.

In operation 609, the File module 407 provides the OS module operating in a kernel mode with the name of the partition, offset information in the partition, data, and the size of the data (raw input), requesting write operation. In operation 610, the OS module writes data on the disk based on the received information.

In operation 611, the OS module notifies the File module 407 that the write operation is completed. In operation 612, the File module 407 informs the Inode module 406 that the write operation is completed. In operation 613, the Inode module 406 requests the DBMS 411 to update inode.db by applying the changes that occurred in the corresponding file. According to the request, the DBMS 411 changes information about the last modified time and the size of the file (not shown). Also, in operation 614, the File module 407 requests the DBMS 411 to modify extents.db. After receiving the request, the DBMS 411 updates extents.db, by applying information about the block in which the data is newly written (not shown).

In operation 615, the File module 407 notifies the Syscall module 402 that the write operation is completed. In operation 616, the Syscall module 402 requests the DBMS 411 to finish the transaction. In operation 617, the DBMS 411 finishes the transaction which started in operation 603.

Figure 7:
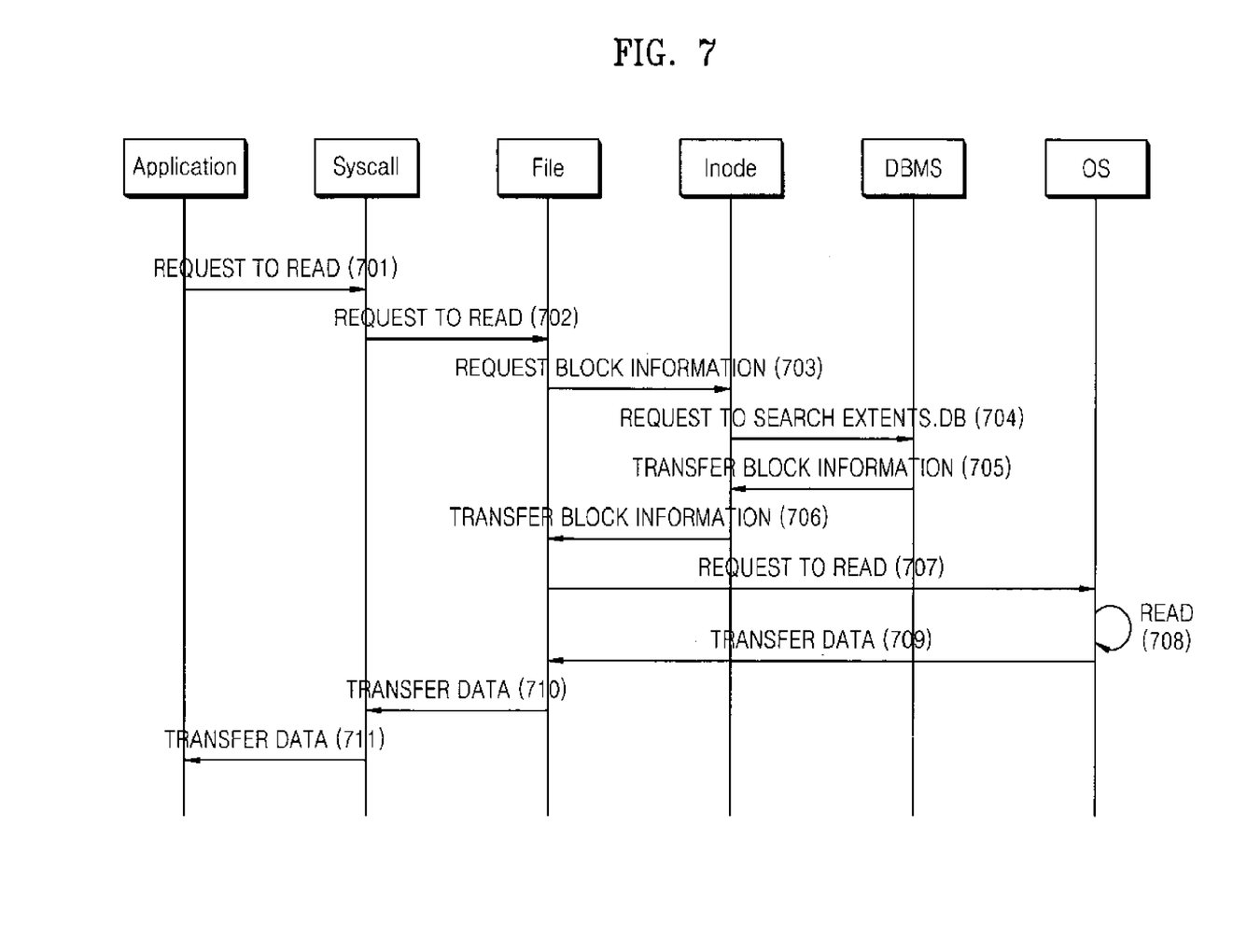
FIG. 7 is a diagram illustrating a process of reading a file in a file system according to an exemplary embodiment of the present invention.

FIG. 7 is a diagram illustrating a process of reading a file in the file system illustrated in FIG. 4 according to an exemplary embodiment of the present invention. In the current embodiment, it is assumed that the DBAL module 410 and the OSAL module 409 are not used.

In operation 701, the application 401 requests the Syscall module 402 to read data from a file, by providing the name of the file, offset information in the file and the size of the data.

In operation 702, the Syscall module 402 requests the File module 407 to read the data, and in operation 703, the File module 407 requests the Inode module 406 for information about corresponding blocks.

After receiving the request, the Inode module 406 requests the DBMS 411 to search extents.db in operation 704. The DBMS 411 searches extents.db, extracts information about blocks in which the data is stored, and then transfers the extracted information to the Inode module 406 in operation 705.

In operation 706, the Inode module transfers the block information to the File module 407.

In operation 707, the File module 407 requests the OS module to read the data by providing the name of the partition, offset information in the partition and the size of the data (raw output).

In operation 708, the OS module reads the data on the disk and transfers the read data to the File module 407 in operation 709.

In operation 710, the File module 407 transfers the data to the Syscall module 402. In operation 711, the Syscall module 402 transfers the data to the application 401. In this way, the read operation is completed.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

According to a file system of an exemplary embodiment of the present invention, metadata of the file system is processed through an API provided by a DBMS and thus transactions can be stably guaranteed.

Though the file system does not participate in a disk layout, the file system directly controls the disk layout in relation to file data. Accordingly, a disk allocation algorithm optimized with respect to a multimedia environment can be designed and used.

Furthermore, in the file system of an exemplary embodiment of the present invention, the DBMS manages only the metadata, and not file data, and does not generate a log on the file data. Accordingly, even though the size of the file increases, degradation of the performance does not occur.

Also, the file system of an exemplary embodiment of the present invention operates at a user level, not at a kernel level, and thus the source code of the file system does not rely on an OS. Accordingly, it is easy to port the file system to other OSs, and maintenance of the file system is easier.

In addition, in the file system of an exemplary embodiment of the present invention, metadata and file data are stored in separate disks, and thus inputting a file to or outputting a file from the disk can be performed more efficiently than in the related art file systems.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of managing data in a file system having a plurality of functional modules, the plurality of functional modules comprising a database management system (DBMS) module and at least one file system module, comprising:

receiving, by the at least one file system module, a data write request from an application to write data to a storage device;

searching, by the DBMS module, at least one database that stores free space information that indicates free disk blocks available for storage from among disk blocks in the storage device into which to store the data, and transmitting information indicating the free disk blocks to the at least one file system module;

selecting, by the at least one file system module bypassing the DBMS, disk blocks of the storage device from among the free disk blocks into which the data is to be written, based on the information;

writing the data, by the at least one file system module bypassing the DBMS, in the selected disk blocks of the storage device; and updating mapping information of an offset of the data and a block address of the disk blocks of the storage device into which the data is written in the at least one database, by the DBMS module, based on the data written in the selected disk blocks, in response to the at least one file system module writing the data in the selected disk blocks, wherein the searching, determining, writing, and updating are managed by the DBMS module as one transaction, wherein the selecting comprises selecting the free disk blocks of the storage device based on a disk allocation algorithm configured to optimize storage of the data in the storage device.

2. The method of claim 1, wherein the file system operates at a user level.

3. The method of claim 1, wherein the data is stored on the storage device and the at least one database is stored on a different storage device.

4. The method of claim 1, wherein the updating comprises requesting, by the at least one file system module, the DBMS module to update at least one of a database table of the at least one database containing information about free disk blocks available for storage, a database table of the at least one database containing information about disk blocks unavailable for storage, and a database table of the at least one database containing information about an inode.

5. The method of claim 1, wherein the at least one database expresses information indicating the free disk blocks of the storage device in the form of an extent.

6. The method of claim 5, wherein the extent form is expressed with a block number indicating a start position of the free disk blocks and a number of the free disk blocks corresponding to size of free space.

7. The method of claim 5, wherein the extent form is expressed with a byte offset indicating a start position of the free disk blocks and a byte unit indicating size of free space.

8. The method of claim 1, wherein the storage device is a hard disk.

9. A non-transitory computer readable recording storage medium storing a computer program for performing a method of managing data in a file system comprising:

receiving, by an application program interface (API) of the file system, a data write request to write data to a storage device from an application;

requesting, by the file system, a database management system (DBMS) to search for free disk blocks in the storage device into which to store the data;

searching, by the DBMS, at least one database that stores free space information that indicates free disk blocks available for storage from among disk blocks in the storage device, and transmitting the information indicating the free disk blocks to the file system;
selecting, by the file system, disk blocks of the storage device from among the free disk blocks into which the data is to be written, based on the information indicating the free disk blocks;
writing the data, by the file system bypassing the DBMS, in the selected disk blocks of the storage device; and
updating mapping information of an offset of the data and a block address of the disk blocks of the storage device into which the data is written in the at least one database, by the DBMS, based on the data written in the selected disk blocks, in response to the file system writing the data in the selected disk blocks,
wherein the searching, determining, writing, and updating are managed by the DBMS as one transaction,
wherein the selecting comprises selecting the free disk blocks of the storage device based on a disk allocation algorithm configured to optimize storage of the data in the storage device.

* * * * *